(12) United States Patent
Kim et al.

(10) Patent No.: US 9,380,550 B2
(45) Date of Patent: Jun. 28, 2016

(54) METHOD FOR CHECKING AVAILABILITY OR STATE OF PEER ENTITY

(71) Applicant: LG ELECTRONICS INC., Seoul (KR)

(72) Inventors: Jinho Kim, Anyang (KR); Wookbong Lee, Anyang (KR); Suhwook Kim, Anyang (KR); Jinyoung Chun, Anyang (KR); Jinsam Kwak, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 14/381,937

(22) PCT Filed: Feb. 1, 2013

(86) PCT No.: PCT/KR2013/000830
§ 371 (c)(1),
(2) Date: Aug. 28, 2014

(87) PCT Pub. No.: WO2013/133536
PCT Pub. Date: Sep. 12, 2013

(65) Prior Publication Data
US 2015/0016383 A1    Jan. 15, 2015

Related U.S. Application Data

(60) Provisional application No. 61/607,611, filed on Mar. 7, 2012, provisional application No. 61/608,103, filed on Mar. 7, 2012.

(51) Int. Cl.
| | | |
|---|---|---|
| *H04W 60/02* | (2009.01) | |
| *H04W 16/14* | (2009.01) | |
| *H04W 24/08* | (2009.01) | |
| *H04W 76/04* | (2009.01) | |
| *H04W 48/10* | (2009.01) | |
| *H04W 88/06* | (2009.01) | |

(52) U.S. Cl.
CPC .............. *H04W 60/02* (2013.01); *H04W 16/14* (2013.01); *H04W 24/08* (2013.01); *H04W 76/04* (2013.01); *H04W 48/10* (2013.01); *H04W 88/06* (2013.01)

(58) Field of Classification Search
CPC . H04W 16/14; H04W 72/0453; H04W 84/12; H04W 48/16; H04W 28/18
See application file for complete search history.

(56) References Cited

U.S. PATENT DOCUMENTS

| | | | |
|---|---|---|---|
| 2008/0059582 A1* | 3/2008 | Hartikainen et al. | 709/204 |
| 2011/0077042 A1* | 3/2011 | Stanforth et al. | 455/512 |

(Continued)

FOREIGN PATENT DOCUMENTS

| | | |
|---|---|---|
| KR | 10-2012-0005494 | 1/2012 |
| WO | 2012/005557 | 1/2012 |
| WO | 2012/020982 | 2/2012 |

OTHER PUBLICATIONS

PCT International Application No. PCT/KR2013/000830, Written Opinion of the International Searching Authority dated May 15, 2013, 16 pages.

*Primary Examiner* — Jung Park
(74) *Attorney, Agent, or Firm* — Lee, Hong, Degerman, Kang & Walmey; Jonathan Kang; Michael Monaco

(57) ABSTRACT

A method for checking availability of one of Television White Space (TVWS) devices by a management device for managing the TVWS devices to co-exist in a TVWS according to one embodiment of the present invention can comprise the following steps: receiving a registration request message for registering the TVWS device or updating the registration of the TVWS device from the TVWS device; registering the TVWS device or updating the registration of the TVWS device; transmitting a check request message for checking the availability of the TVWS device to the TVWS device after registering the TVWS device or updating the registration of the TVWS device, the check request message including a time parameter; and determining the availability of the TVWS device on the basis of the time parameter.

10 Claims, 13 Drawing Sheets

(56) References Cited

U.S. PATENT DOCUMENTS

2011/0282915 A1  11/2011  Steer et al.
2011/0287802 A1* 11/2011  Ma et al. ........................ 455/517
2011/0310865 A1  12/2011  Kennedy et al.
2012/0094681 A1*  4/2012  Freda et al. ................ 455/452.1
2012/0106461 A1*  5/2012  Kasslin et al. ................ 370/329
2012/0120892 A1*  5/2012  Freda et al. .................... 370/329
2012/0201209 A1*  8/2012  Lee et al. ....................... 370/329
2012/0315855 A1* 12/2012  Li et al. ......................... 455/67.7

* cited by examiner (a)  (b)

(a)

(b)

(a)  (b)

(a)

(b)

(a)

(b)

(c)

(a)

(b)

METHOD FOR CHECKING AVAILABILITY OR STATE OF PEER ENTITY

CROSS REFERENCE TO RELATED APPLICATIONS

This application is a National Stage filing under 35 U.S.C. 371 of International Application No. PCT/KR2013/000830, filed on Feb. 1, 2013, which claims the benefit of U.S. Provisional Application Ser. Nos. 61/607,611, filed on Mar. 7, 2012, and 61/608,103, filed on Mar. 7, 2012, the contents of which are all hereby incorporated by reference herein in their entirety.

TECHNICAL FIELD

The present invention relates to a method and apparatus for checking availability or status of a peer entity in a television white space (TVWS) network.

BACKGROUND ART

Conventionally, frequency allocation for new services or frequency allocation to new operators has been led by the government. In particular, if new operators are present, new frequencies have been allocated thereto through auction or existing frequencies have been reallocated thereto through retrieval from existing operators, so that restricted frequency resources are distributed.

However, as the demand for radio data traffic has explosively increased due to the spread of various radio Internet based applications such as an open mobile terminal platform, a web store, a mobile voice-over-Internet protocol (VoIP), etc., government-driven frequency allocation is considerably inefficient and it becomes increasingly difficult to ensure new frequencies in a frequency distribution table.

Especially, along with rapid growth of broadcast and communication systems, a next-generation communication system has been designed in the form of convergence of multiple networks, the system has become increasingly complicated, and the necessity of linking the networks to each has been gradually expanded. In addition, as communication technology and services have developed, frequency resources are frequently used and, as a specific frequency band has been fixedly occupied to provide better communication technology and services, frequency depletion has becomes a problem.

Recently, frequency sharing schemes have been proposed as a method for solving such a problem. Thereamong, there is technology for adaptively and opportunistically using a spectrum hole (or white space) which is temporally/spatially unused due to low utilization among frequency bands assigned as unlicensed bands in TV broadcast bands. If a primary user having a license for the used bands is discovered, use of the bands should be immediately stopped or the transmit power of the bands should be adjusted so that the primary user is not harmed. A system for performing frequency sharing using the spectrum hole is referred to as a television band device (TVBD) or a television white space (TVWS) system and networks or devices using a shared frequency resource in the TVBD or TVWS system are referred to as TVBD or TVWS networks or devices.

Meanwhile, regardless of whether a communication session between the TVWS networks or devices in the TVWS system is in a normal state, a TVWS network or device may attempt to perform a specific procedure through message transmission and reception to and from another TVWS network or device. If the communication session is not in a normal state, the above attempt is unnecessary and may lead to waste of a frequency/channel resource or a power resource.

DETAILED DESCRIPTION OF THE INVENTION

Technical Problems

The present invention provides a method for checking availability or status of a peer entity to determine whether a communication session between TVWS networks or devices is in a normal state.

The technical objects that can be achieved through the present invention are not limited to what has been particularly described hereinabove and other technical objects not described herein will be more clearly understood by persons skilled in the art from the following detailed description.

Technical Solutions

According to an embodiment of the present invention, provided herein is a method for checking availability of one of television white space (TVWS) devices by a management device for enabling the TVWS devices to coexist in a TVWS, the method comprising: receiving a registration request message for registration or update registration of the TVWS device from the TVWS device; performing the registration or the update registration of the TVWS device; further to performing the registration or the update registration of the TVWS device, transmitting a check request message for checking availability of the TVWS device to the TVWS device, the check request message including a time parameter; and checking the availability of the TVWS device based on the time parameter.

Additionally or alternatively, the time parameter may indicate a transmission interval of the check request message.

Additionally or alternatively, the checking may include determining that the TVWS device is available if a check response message in response to the check request message is received from the TVWS device within a time corresponding to the time parameter.

Additionally or alternatively, the checking may include determining that the TVWS device is not available if a check response message in response to the check request message is received from the TVWS device after a time corresponding to the time parameter.

Additionally or alternatively, the transmitting may include transmitting N check request messages at a time interval corresponding to the time parameter.

Additionally or alternatively, the checking may include determining that the TVWS device is available if at least one check response message in response to the N check request messages is received from the TVWS device within a time corresponding to a time parameter included in at least one check request message corresponding to the at least one check response message.

Additionally or alternatively, the checking may include determining that the TVWS device is not available if check response messages in response to the N check request messages are received from the TVWS device after a time corresponding to a respective time parameter included in each of the N check request messages.

According to another embodiment of the present invention, provided herein is a method for checking availability of a management device for managing television white space (TVWS) devices by a server for enabling the TVWS devices to coexist in a TVWS, the method comprising: receiving a registration request message for registration or update registration of the management device from the management device; performing the registration or the update registration of the management device; further to performing the registration or the update registration of the management device, transmitting a check request message for checking availability of the management device to the management device, the check request message including a time parameter; and checking the availability of the management device based on the time parameter.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the embodiments of the present invention, a TVWS network or device can check availability or status of another TVWS network or device and thus can prevent waste of a frequency/channel resource or a power resource.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
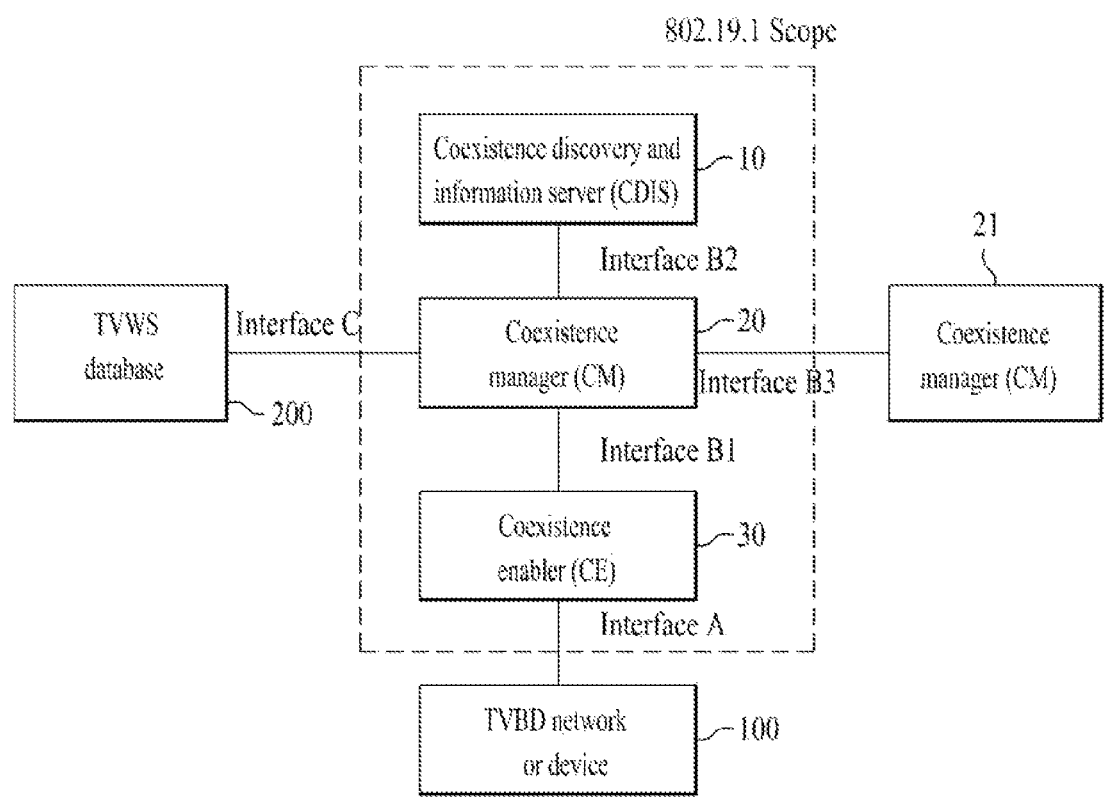
FIG. 1 is a block diagram illustrating a coexistence system according to an embodiment of the present disclosure.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention. As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail by explaining exemplary embodiments of the invention with reference to the attached drawings. The same reference numerals in the drawings denote like elements, and a repeated explanation thereof will not be given.

In the description of the present invention, certain detailed explanations of related art are omitted when it is deemed that they may unnecessarily obscure the essence of the invention. The features of the present invention will be more clearly understood from the accompanying drawings and should not be limited by the accompanying drawings. It is to be appreciated that the spirit and technical scope of the present invention can encompass all changes, equivalents, and substitutes in addition to the attached drawings.

FIG. 1 is a block diagram illustrating a coexistence system according to an embodiment of the present invention.

In this specification, coexistence refers to the capability of two or more frequency (spectrum)-dependent devices or networks to operate without harmful interference. In addition, a coexistence service refers to a service provided to dissimilar or independently operated white space objects (WSOs) by a coexistence system and a service provided to other entities of the coexistence system by entities of the coexistence system. The WSO is an entity indicating a television white space (TVWS) devices, a television band device (TVBD), a network of TVWS devices, or a TVBD network and is connected to a coexistence enabler for consumption of coexistence services.

In this specification, the TVWS device and the TVBD or TVBD device are interchangeable, the TVWS network and the TVBD network are also interchangeable termed, and these terms may correspond to an entity referred to as a WSO.

As illustrated in FIG. 1, a structure of a coexistence system, that is, an 802.19 system includes three logical entities and six logic interfaces. Here, the logical entities may be installed or mounted on respective physical devices. Thus, the logical entities may be embodied as hardware using the devices on which the logical entities are installed or mounted. In order to clarify claims of the present invention, the logical entity may be termed an apparatus or device in this specification including the claims. For example, a coexistence manager (CM) 20 may be termed a "management apparatus" and a coexistence discovery and information server (CDIS) 10 may be simply termed a "server".

The three logical entities are each defined as the CM 20, a coexistence enabler (CE) 30, and a coexistence database (CD) or coexistence discovery and information server (CDIS) 10 according to function. The six logic interfaces are each defined as an interface A, an interface B1, an interface B2, an interface B3, an interface C, and an interface D according to whether the logic interface interfaces with another logical entity of 802.19.1.

Additionally, the 802.19 system is connected to external elements such as a TVWS database 200, a TVBD network or device 100, or an operator management entity (OME) 300.

Here, TV white space refers to a vacant frequency band that is not used by a broadcaster in VHF and UHF frequency bands that are distributed for TV broadcast and refers to an unlicensed band that can be used by any user when he or she satisfies conditions of radio wave regulations of the government. In detail, the TV white space refers to a vacant band for prevention of frequency interference between broadcasters and a frequency band that is not used for each region or an area to which radio waves for broadcast do not reach for each region from a spatial point of view, and refers to a vacant broadcast frequency in a time zone when a broadcaster does not broadcast at dawn from a temporal point of view.

A TV whitespace includes VHF bands 54 to 60, 76 to 88, and 174 to 216 MHz and UHF bands 470 to 698 MHz that are allocated to a broadcast TV system. In 512 to 608 MHz and 614 to 698 MHz, operations are allowed for all unlicensed devices except for in some particular cases, but bands 54 to 60 MHz, 76 to 88 MHz, 174 to 216 MHz, and 470 to 512 MHz, only communication between fixed devices is allowed. A fixed device is a device that performs transmission from a fixed location.

A TV white space device should not interfere with a TV viewer as a customer of a broadcaster, should not interrupt reception, and should not affect a wireless microphone device that communicates with low power using a portion of the band. In order satisfy this condition, the TV white space device requires the following technologies.

The TV white space device may require technologies such as a spectrum sensing technology for recognizing a TV channel being used to protect a broadcast channel, a access protocol technology for database having position-based TV channel information, a coexistence technology between heterogeneous devices using a TVWS band, an intelligent and autonomous wireless access element technology for a variable radio channel, a security technology for subscriber authentication for radio channel protection and protection of DBs and users, etc. The present invention will be described in terms of a coexistence technology between homogeneous or heterogeneous apparatuses (or devices) among these technologies.

The CM 20 and the CE 30 are logical entities defined for coexistence between different wireless service providers or wireless systems that operate in an unlicensed state in a TVWS. The CM 20 is an entity for resource allocation in order to overcome an issue associated with an interface between CEs 30 connected to the CM 20 while providing a guideline and policy associated with coexistence for coexistence between different service providers and systems operating in a TVWS.

The CE 30 may request and acquire information required for coexistence to and from the TVBD network or device 100, convert structure change requests/commands and control information received from the CM 20 into TVBD-specific structure change requests/commands, and transmit the TVBD-specific structure change requests/commands to the TVBD network or device 100. The TVBD network or device 100 refers to a user equipment for allowing use of a TV white space in the federal communication commission (FCC).

In order to overcome a coexistence issue between TVBD networks, the CM 20 may have a function of searching for other CMs, a coexistence decision making function of generating and providing control information and coexistence request/command corresponding to the CE 30, and a function of supporting information exchange required for coexistence between CMs (which may include hierarchical or peer-to-peer decision making when CMs are arranged).

The CM 20 may have a function of selecting a master CM by sharing information between various CMs, a function of generating a coexistence whitespace map having a distributed topology in order to effectively share frequency resources between different networks and systems, and a function of adjusting networks during management associated with TVWS coexistence.

The CM 20 may be embedded in a device such as an access point (AP) or may be installed out of the device. A fixed device such as an access point (AP) may have a function of the CM 20 and may select and manage a master CM for mastering a set including devices that are spatially separated, a service provider, or a specific system.

In this case, the master CM may be selected by the CD or CDIS 10 for allowing spatial reuse between spatially separated users. In this case, an interface map between CMs for resource allocation may be acquired as geo-location information or acquired by further using and processing neighbor information acquired from CMs. In the case of homogeneous networks, the master CM may be selected via communication between the networks, and in the case of heterogeneous networks, the master CM may be selected via negotiation via the CD or CDIS 10.

The CM 20 may have a hierarchical CM structure according to coverage or specific classification standard. With reference to a whitespace map (WM) acquired from the CD or CDIS 10, a procedure in which an uppermost-layer CM selects a resource in consideration of a lower layer of the uppermost-layer CM and a lower-layer CM selects a resource among the remaining resources in consideration a lower layer of the lower-layer CM.

In the case of a small size network with low coverage/power, the probability that a primary user is detected is relatively low and thus more available TVWS channels are present. Accordingly, a small size network compares a whitespace map (WM) of adjacent heterogeneous networks and a whitespace map (WM) of the small size network via the CM 20 and preferentially selects and uses a channel that cannot be used by adjacent networks, which can be adjusted by the CDIS 10 but can be distributively performed in a reverse order from the small size network.

The CD or CDIS 10 may have a function of generating a coexistence whitespace map having a centralized topology in order to effectively sharing a frequency resource between different networks and systems, a function of controlling a plurality of operators during management associated with TVWS coexistence, and a function of selecting a master CM in order to reduce communication overhead between CMs and to overcome the coexistence issue.

In addition, the CD or CDIS 10 may perform a function of calculating a coexistence contour in order to search for neighboring networks/systems, a function of redirecting a resource C-MAP according to a TVDB in order to the coexistence issue, a function of boosting opening of an interface between CMs to support search of CMs, and a function of collecting, synthesizing, and providing information for boosting of coexistence.

The CD 10 may omnipotently distribute resources for resource allocation, may suggest a criteria of priority between CMs and control resource selection of each CM as an intermediary, or may function as a medium for sharing information between external and heterogeneous networks between CMs as a DB.

The interface may be classified into three groups as illustrated in FIG. 1. The interface may classified into interface B1, an interface B2, and an interface B3 as an interface between 802.19.1 entities, an interface A as an interface between an 802.19.1 entity and a TVBD network/device, and an interface C and an interface D as an interface between an 802.19.1 entity and a TVWS database or an OME. The different interfaces in each group may be classified according to a using method thereof, a type of exchanged information, and underlying protocols.

The interface A may be an interface between the CE 30 and the TVBD network or device 100 and may be used to receive information required for coexistence, configuration/information request for coexistence, configuration/measurement/information response for coexistence, and other information as necessary from the TVBD network or device 100. Reconfiguration request/command and control information (corresponding to control information and coexistence request/command received from the CM), request/command associated with control of a measurement value, performed by the TVBD network or device 100, information indicating available resources, and other information as necessary from the CE 30 to the TVBD network or device 100.

The interface B1 may be an interface between the CE 30 and the CM 20 and may be used to provide information required for coexistence (information acquired from the TVBD network or device 100) and other information as necessary to the CM 20 from the CE 30. Coexistence request/command and control information and other information as necessary may be provided to the CE 30 from the CM 20.

The interface B2 may be an interface between the CM 20 and the CD or CDIS 10 and may be used to provide information required for a coexistence map, information required for a neighbor set, information required for registration/unenrollment, information required for searching (which is acquired by a currently used CM), information required for coexistence, and information as necessary to the CD or CDIS 10 from the CM 20.

Information indicated for a coexistence map, information indicated for a neighbor set, information indicated for a master CM, information required for search (which is acquired by another CM), information required for coexistence (which is acquired by another CM), and other information as necessary are provided to the CM 20 from the CD or CDIS 10.

The interface B3 may be an interface between the CM 20 and a CM 21 and may be used to provide information and messages for searching and coexistence, information indicated for registration/unregistration (to a master CM from a CM or to a server CM from a device CM), information indicated for coexistence (to a master CM from a CM or to a device CM from a server CM), and other information to the CM 21 from the CM 20.

The interface C may be an interface between the TVBD device 100 and the TVWS database 200 and may be used to provide information indicated for an available channel to the TVBD device 100 from the TVWS DB 200.

The coexistence system described with reference to FIG. 1 may have various topologies and may be largely classified into a centralized topology, a distributed topology, an autonomous topology. The present invention will be described in terms of a coexistence system having centralized and distributed topologies.

Figure 2:
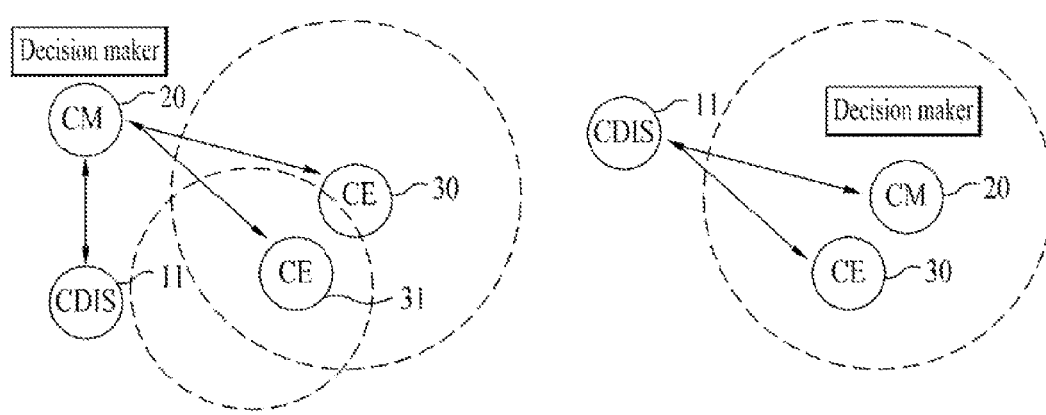
FIG. 2 is a view conceptually illustrating a method of selecting a master coexistence manager (CM) in a coexistence system having centralized topology according to an embodiment of the present disclosure.

FIG. 2 is a diagram illustrating concept of a method for selecting a master CM in a coexistence system with a centralized topology according to an embodiment of the present invention. As illustrated in FIG. 2, in the coexistence with a centralized topology, a CDIS 11 mainly stores and processes data and the CM 20 may function as a decision maker. In particular, the master CM 20 may control all networks or other UEs. In this case, one of TVBDs that interface with a network may be selected as the master CM 20.

Figure 3:
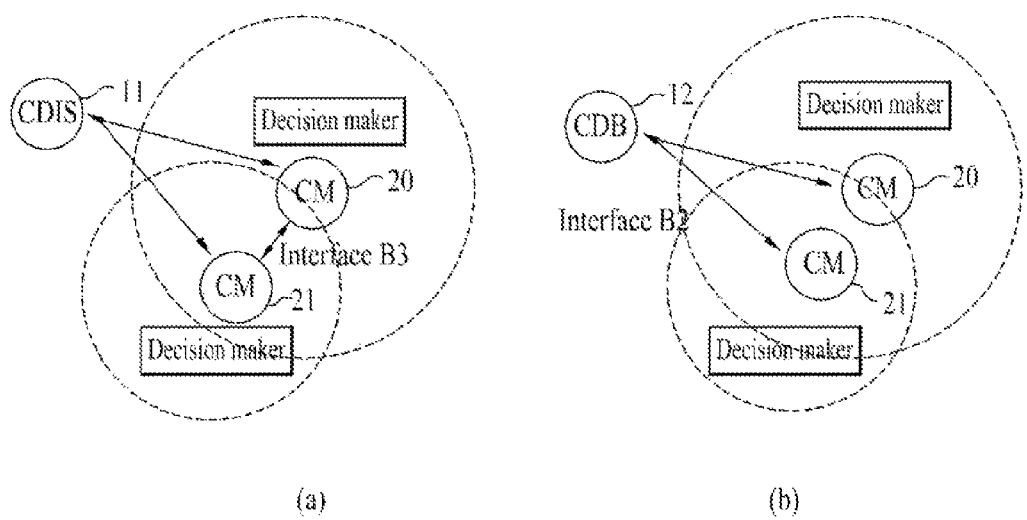
FIG. 3 is a view conceptually illustrating a method of selecting a master CM in a coexistence system having distributed topology according to an embodiment of the present disclosure.

FIG. 3 is a diagram illustrating concept of a method for selecting a master CM in a coexistence system with a distributed topology according to an embodiment of the present invention. As illustrated in FIG. 3, in the coexistence with a distributed topology, the CDIS 11 or a coexistence database (CDB) 12 may boost opening of interfaces between CMs, and the CM 20 may exchange information required for coexistence and perform hierarchical or peer-to-peer decision making.

The coexistence system of FIG. 3 may perform decision making via negotiation between CMs through an interface (the interface B3) to determine a master CM as illustrated in FIG. 3(*a*) or the CM 20 may request mediation to the CDIS 11 or a CDB 12 through an interface (the interface B2) to perform decision making or determine a master CM as illustrated in FIG. 3(*b*)

Figure 4:
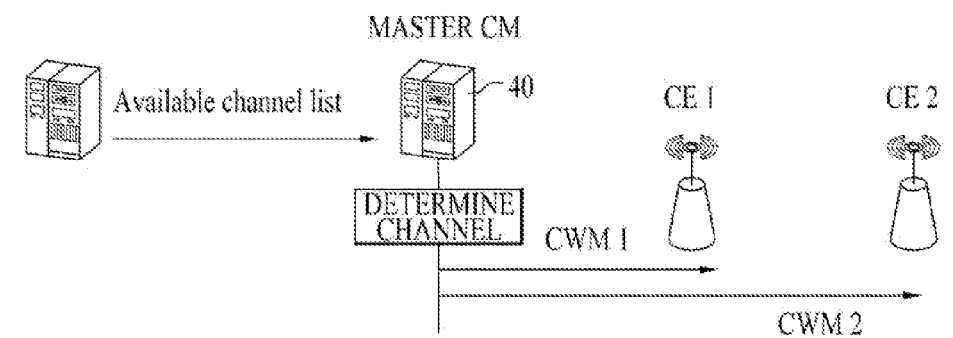
FIG. 4 is a view conceptually illustrating the differences in operation between centralized topology and distributed topology in a coexistence system according to an embodiment of the present disclosure.
Figure 4:
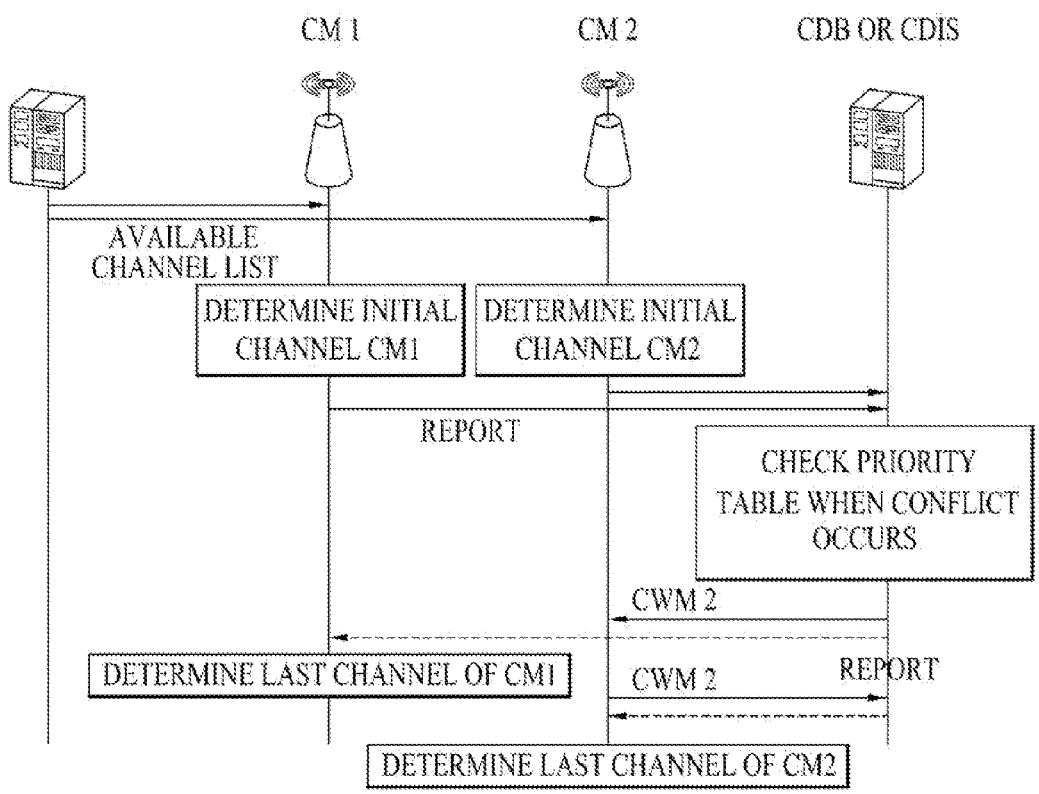

FIG. 4 is a diagram illustrating concept of comparison between operations of coexistence systems with a centralized topology and a distributed topology according to an embodiment of the present invention. As illustrated in FIG. 4(*a*), in the coexistence system with a centralized topology, a master (master or super) CM 40 may allocate independent channels to different CMs (or CEs), respectively. In this case, a coexistence whitespace map (CWM) may be used to indicate channels to be used.

As illustrated in FIG. 4(b), in the coexistence system with a distributed topology, CMs (e.g., a CM1 and a CM2) may be classified and given by priority according to predetermined based or standard. The CM 20 may report/send priority information about available channels to CDB/CDIS or other CMs. In this case, a CWM may be used as channels to be selected by CMs.

System requirements for decision making illustrated in FIG. 4 will now be described. An 802.19.1 system needs to analyze acquired information, to perform coexistence determination, and to support various topologies. Here, information may contain a bandwidth of each TVWS network or device, power limitation of each TVWS channel and an available channel list obtained from each TVWS network/device, and regulations, system parameters or pre-analyzed surrounding information, irrespective of a type of topology.

Figure 5:
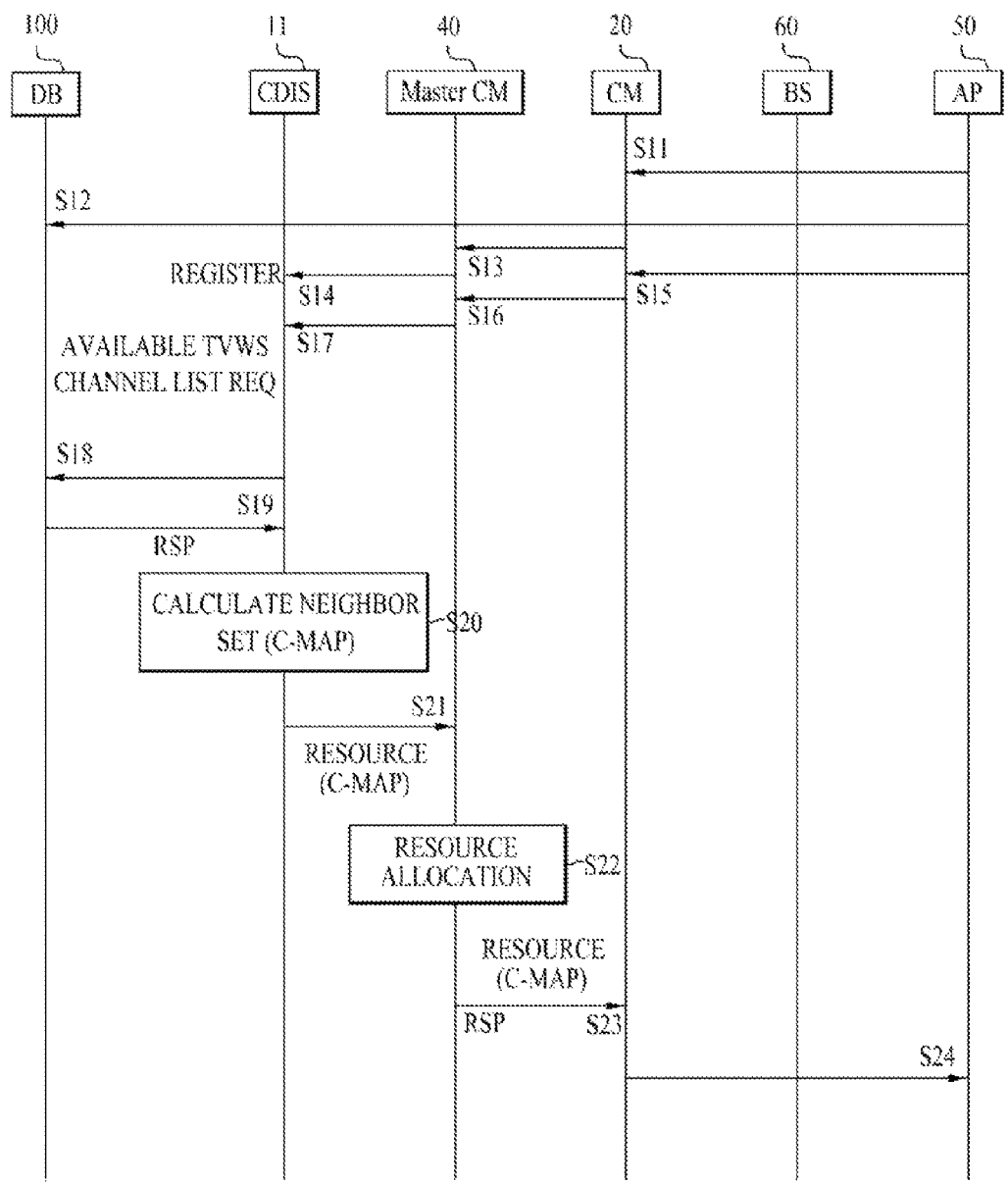
FIG. 5 is a flowchart illustrating resource allocation by a master CM in a coexistence system having centralized topology according to an embodiment of the present disclosure.
Figure 6:
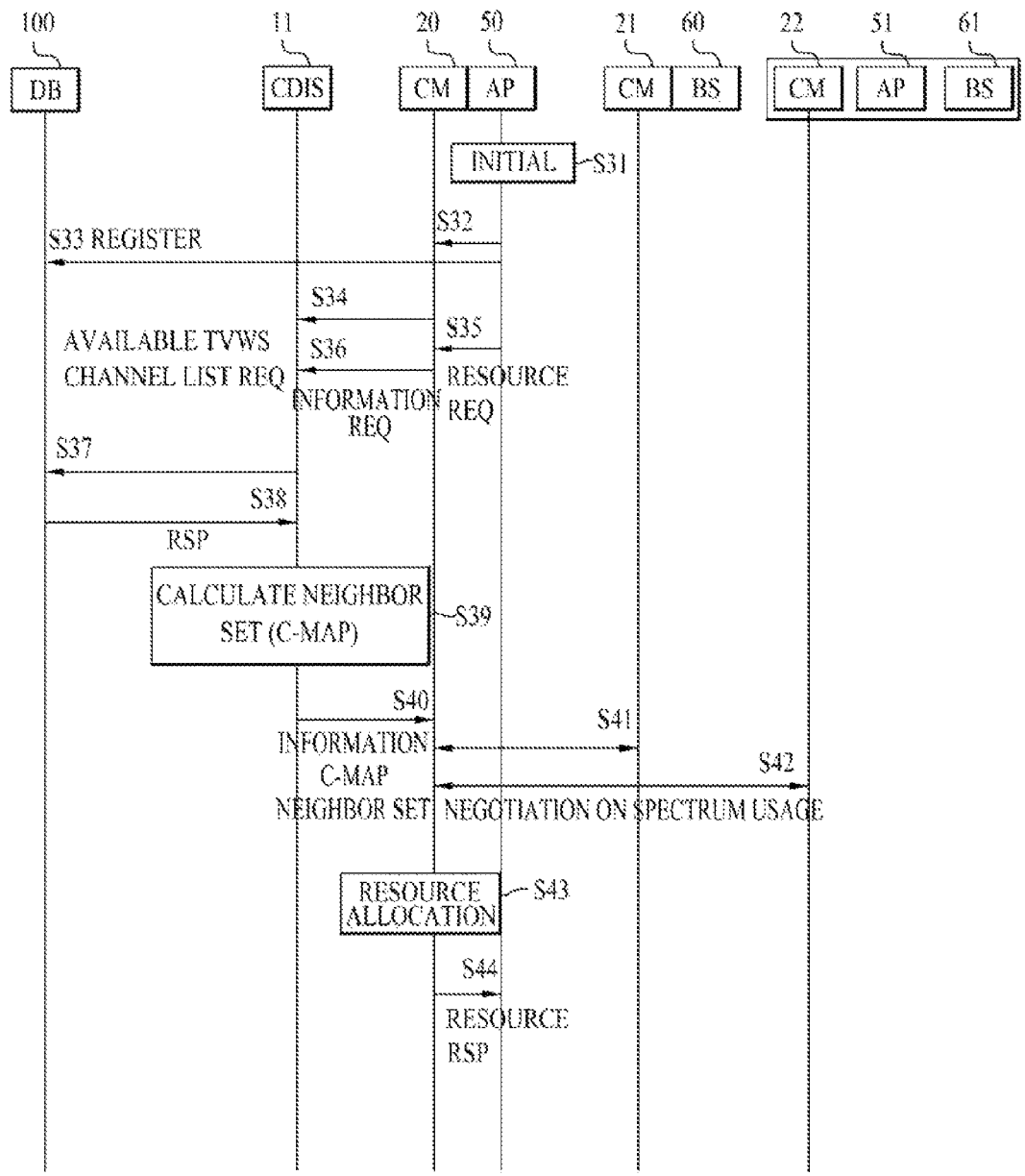
FIG. 6 is a flowchart illustrating resource allocation by a master CM in a coexistence system having distributed topology according to an embodiment of the present disclosure.

FIGS. 5 and 6 are signal flowcharts of a method for allocating a resource by a master CM or a mater device in the coexistence systems with a centralized topology and a distributed topology described with reference to FIGS. 2 to 4.

FIG. 5 is a signal flowchart illustrating a method for allocating a resource by a master CM in a coexistence system with a centralized topology according to an embodiment of the present invention.

As illustrated in FIG. 5, the method for allocating a resource by the master CM 40 in one centralized topology may include steps S15 to S17 of requesting resources by an AP 50, steps S18 to S21 of acquiring an available channel list from the TVBD 100 by the CDIS 11 to indicate the available channel list to the master CM 40, and steps S22 to S24 of allocating a resource to the CM 20 by the master CM 40.

Hereinafter, a procedure of allocating a resource by a master CM by a centralized topology will be described in detail with reference to FIG. 5.

When an AP 50 is registered to the TVDB 100 and the CM 20 (S11 to S12), the CM 20 is registered to the master CM 40 (S13), and the master CM 40 is registered to the CDIS 11 (S14). When the AP 50 requests the CM 20 for a resource via resource request (Resource (C-MAP) REQ) (S15), the CM 20 requests the master CM 40 for a neighbor list and information about C-MAP (S16), and the master CM 40 requests the CDIS 11 for the neighbor list and the information about C-MAP (S17).

The CDIS 11 requests the TVDB 100 for an available TVWS channel list REQ, (S18), receives a response to the request from the TVDB 100 (S19), and calculates a neighbor or a neighbor set of the CM 20 and C-MAP (S20). The CDIS 11 may notify the master CM 40 of C-MAP and a neighbor list of the CM 20 as results obtained via the step S20 (S21). The master CM 40 allocates the resource (C-MAP) based on the notification to the CM 20 (S22 to S23), and the CM 20 notifies the AP 50 of the C-MAP (S24).

FIG. 6 is a signal flowchart illustrating a method for allocating a resource by a master CM in a coexistence system with a centralized topology according to an embodiment of the present invention.

As illustrated in FIG. 6, the method for allocating a resource by the master CM 20 in one distributed topology may include steps S35 to S37 of requesting resources by an AP 50, steps S37 to S40 of acquiring an available channel list from the TVBD 100 by the CDIS 11 to indicate the available channel list to the CM 20, and steps S41 and S42 of negotiating a resource with other CMs (e.g., the CM 21 and the CM 22) by the CM 20.

Hereinafter, a procedure of allocating a resource by the master CM 20 by a distributed topology will be described in detail with reference to FIG. 6.

When the AP 50 is registered to the TVDB 100 and the CM 20 (S31 to S33), the CM 20 is registered to the CDIS 11 (S34). When the AP 50 requests the CM 20 for a resource via resource request (Resource REQ) (S35), the CM 20 requests the CIDS 10 for neighbor list information and C-MAP (S36).

The CDIS 11 requests the TVDB 100 for an available TVWS channel list REQ (S37), receives a response to the request from the TVDB 100 (S38), and calculates a neighbor set of the CM 20 and C-MAP (S39). The CDIS 11 may notify the CM 20 of C-MAP and a neighbor list of CMs as results obtained via the step S39 (S40), and the CM 20 negotiates a resource with other CMs (e.g., the CM 21 and the CM 22) based on the notification (S41 to S42) and reallocates a resource C-MAP to the AP 50 (S43 to S44).

Figure 7:
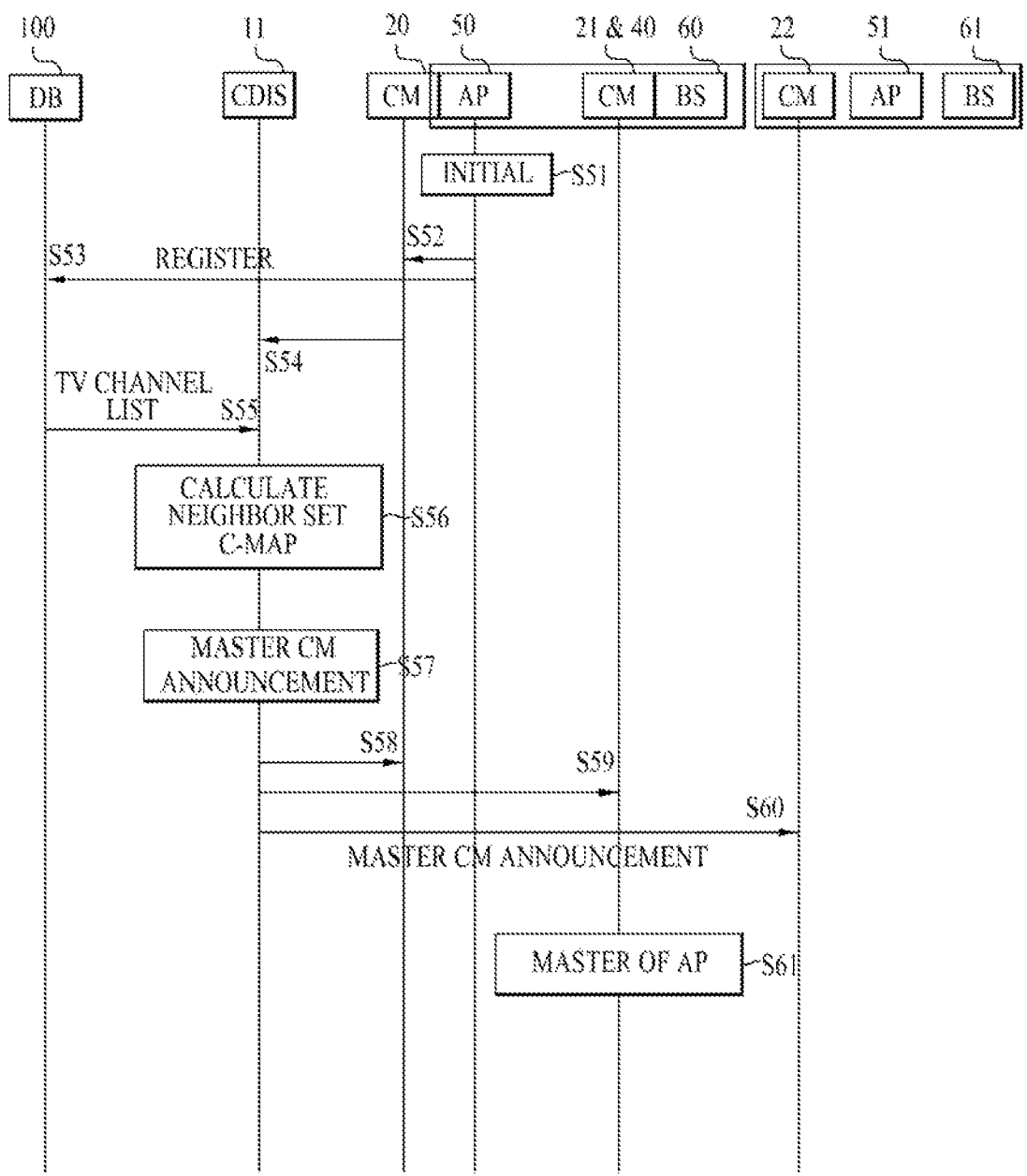
FIG. 7 is a flowchart illustrating a method of selecting a master CM in a coexistence system having centralized topology according to an embodiment of the present disclosure.
Figure 8:
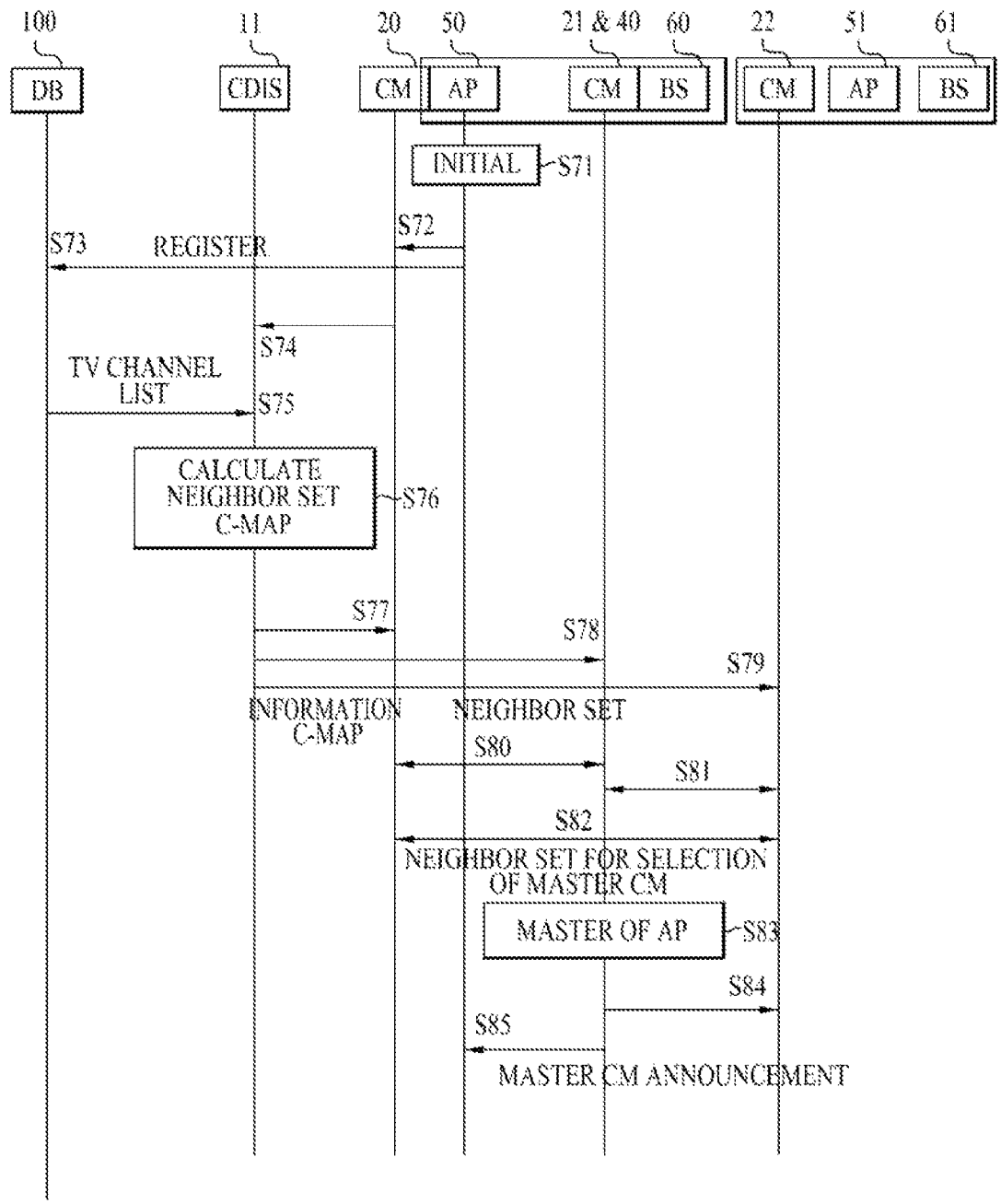
FIG. 8 is a flowchart illustrating a method of selecting a master CM in a coexistence system having distributed topology according to an embodiment of the present disclosure.

FIGS. 7 and 8 are signal flowcharts illustrating a method for selecting a master CM (or a master device) in the coexistence systems with a centralized topology and a distributed topology described with reference to FIGS. 2 to 4.

FIG. 7 is a signal flowchart illustrating a method for selecting the master CM in a coexistence system with a centralized topology according to an embodiment of the present invention.

As illustrated in FIG. 7, the method for selecting the master CM by a centralized topology includes a step S55 of receiving TV channel lists from the TVDB 100 by the CDIS 11, steps S56 and S57 of calculating C-MAP and a neighbor of CMs by the CDIS 11 to select the master CM of CMs, and steps S58 to S60 of notifying the other CMs (the CM 20 and the CM 22) of the selection of the master CM by the CDIS 11.

Hereinafter, a procedure of selecting the master CM in a centralized topology will be described in detail with reference to FIG. 7.

When the AP 50 is registered to the TVDB 100 and the CM 20 (S51 to S53), the CM 20 is registered to the CDIS 11 (S54). The CDIS 11 acquires information of an available TV channel list from the TVDB 100 (S55). Here, the TVDB 100 updates the available TV channel list at a regular interval. The CDIS 11 calculates C-MAP and a neighbor or neighbor set of CMs (e.g., the CM 20 and the CM 22) (S56) to select the CM 21 as the master (S57), and then notifies CMs of the selection of the master CM (S58 to S60). The CM 21 that is finally selected is a master of an AP (S61).

FIG. 8 is a signal flowchart illustrating a method for selecting the master CM in a coexistence system with a distributed topology according to an embodiment of the present invention.

As illustrated in FIG. 8, the method for selecting the master CM by a distributed topology includes a step S75 of receiving channel lists from the TVDB 100 by the CDIS 11, steps S76 to S79 of calculating C-MAP and a neighbor of CMs by the CDIS 11 and notifying CMs of the calculation result, and steps S80 to S82 of performing negotiation between CMs in order to select the master CM 40 or a master device by each of the CMs.

Hereinafter a procedure of selecting the master CM in a distributed topology will be described in detail with reference to FIG. 8.

When the AP 50 is registered to the TVDB 100 and the CM 20 (S71 to S73), the CM 20 is registered to the CDIS 11 (S74). The CDIS 11 acquires information of an available TV channel list from the TVDB 100 (S75). Here, the TVDB 100 updates the available TV channel list at a regular interval. The CDIS 11 calculates—MAP and a neighbor or neighbor set of CMs (S76) and notifies CMs of neighbor lists of the CMs (S77 to S79). The CMs negotiates a resource between the CMs to select a master CM (S80 to S82), and the selected master CM 40 is a master of an AP (S83). The selected master CM 21 notifies the CM of this fact (S84 and S85).

Figure 9:
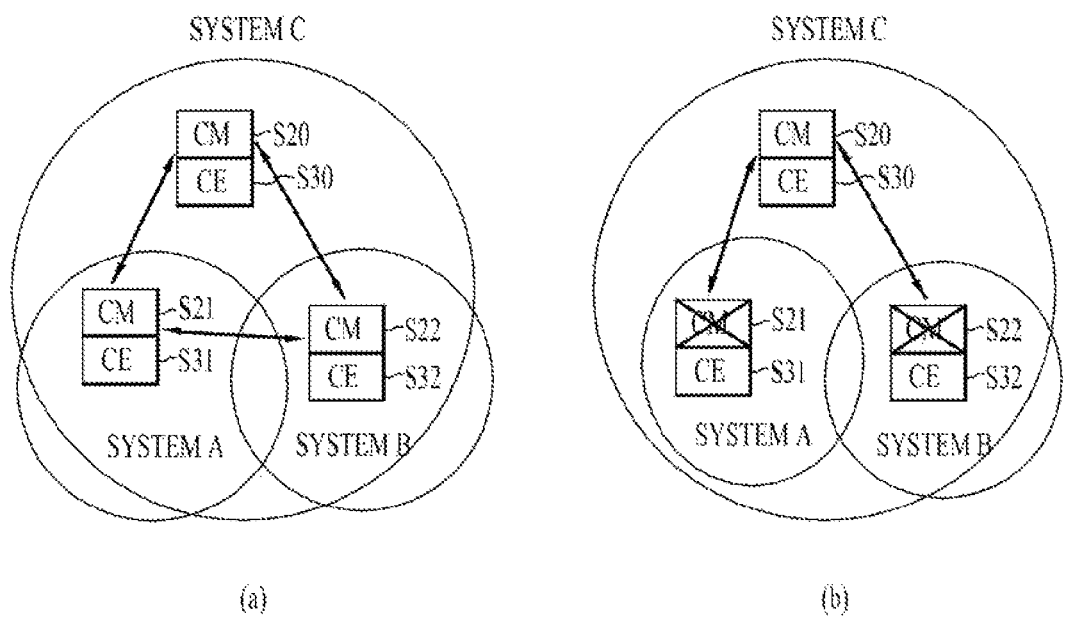
FIG. 9 is a view illustrating adaptive support of various architectures through an enable/disable operation between heterogeneous CMs in a coexistence system according to an embodiment of the present disclosure.
Figure 10:
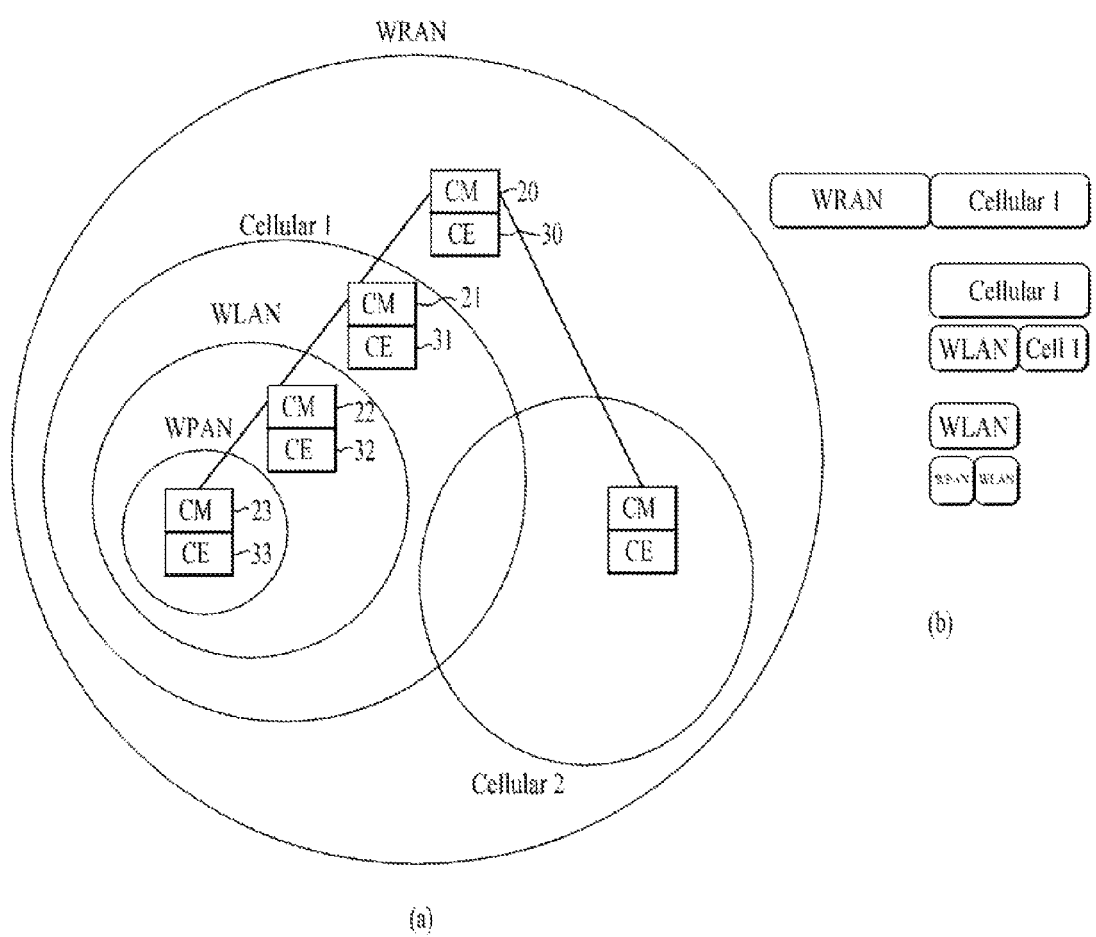
FIG. 10 is a view illustrating an example of forming a hierarchical architecture through an enable/disable operation between heterogeneous CMs in a coexistence system according to an embodiment of the present disclosure.

As seen from FIGS. 9 and 10, in a network in which homogeneous systems can coexist without cooperation, a master CM or a master device (BS, eNodeB, MS, etc.) is selected, and a network or device (or CM/CE of a device) that is not a mater CM or a mater device is controlled to be ON/OFF or disabled so as to adaptively support various types of structures.

FIG. 9 is a diagram illustrating an example in which various structures can be adaptively supported via enable/disable between heterogeneous CMs in a coexistence system according to an embodiment of the present invention.

As illustrated in FIG. 9, CMs of a heterogeneous system that requires cooperation may adaptively support various types of structures ON/OFF, active/inactive, enable/disable, or the like between the CMs. As illustrated in FIG. 9(a), when a structure between CMs of each heterogeneous system (e.g., a system A, a system B, and a system C) is formed as a peer-to-peer structure, it may be seen that an enabled CM 20 is operated as a controller of the disable CM 21 and CM 22 to form a tree structure via enable/disable, etc. between CMs, as illustrated in FIG. 9(b).

FIG. 10 is a diagram illustrating an example in which a hierarchical structure is formed and operated via enable/disable between heterogeneous CMs in a coexistence system according to an embodiment of the present invention. As seen from FIG. 10(a), a master CM may be selected via ON/OFF, active/inactive, enable/disable, or the like between the heterogeneous CMs to form a vertical relation, and each CM may perform decision making on networks of a horizontal layer and a lower layer of the CM.

For example, as illustrated in FIG. 10(b), a cellular system may determine resource regions of the cellular system and a WLAN as a lower layer of the cellular system, and the WLAN may determine resource regions of the WLAN and a WPAN as a lower layer of the WLAN with respect to resources allocated from the cellular system.

Figure 11:
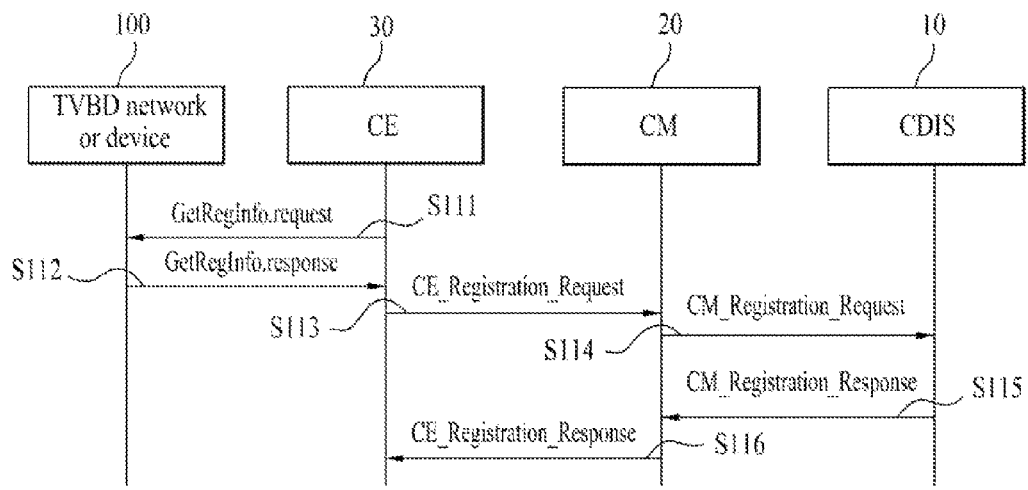
FIG. 11 illustrates a registration procedure according to an embodiment of the present disclosure.
Figure 11:
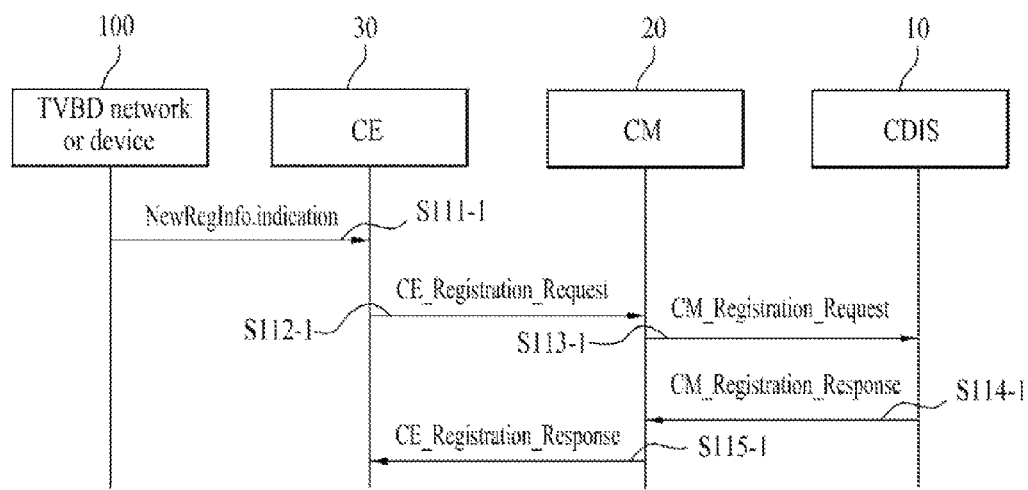

FIG. 11 is a flowchart of a registration procedure according to an embodiment of the present invention.

FIG. 11(a) illustrates a WSO registration procedure. Upon successful completion of subscription of a WSO, a CE 30 may perform the WSO registration procedure. The CE 30 may acquire WSO registration information after successfully completing a WSO subscription procedure. Upon acquiring the WSO registration information, the CE 30 may generate a request message for CE registration, for example, a CE_Registration_Request message and transmit the message to a CM 20 which serves the CE 30.

In more detail, after successfully completing the WSO subscription procedure, the CE 30 may transmit a registration information request message for requesting that registration information be provided, for example, a GetRegInfo.request primitive, to a WSO 100 (S111). The WSO 100 transmits a registration information response message, for example, a GetReginfo.response primitive, to the CE 30 in response to the GetRegInfo request primitive (S112). The registration information response message may include the requested registration information. Upon receiving the registration information response message, the CE 30 may transmit the request message for CE registration, for example, a CE_Registration_Request message, to a CM 20 (S113). The CE 30 may wait for a CE registration response message, for example, a CE_Registration_Response message, to be received from the CM 20. If the CE registration response message is not received within a predetermined time, the CE 30 may retransmit the request message to the CM 20.

Thereafter, the CM 20 may perform WSO registration and transmit, to a CDIS 10, a CM registration request message, for example, a CM_Registration_Request message, for registering or updating the registration information of the WSO to the CDIS 10 (S114). The CM registration request message may include information about the maximum number of WSOs which can be controlled by the CM, a geo-location of the CM, and a coverage radius of the CM and may include other information. The CM 20 may wait for a CM registration response message to be received from the CDIS 10 in response to the CM registration request message. If the response message is not received within a predetermined time, the CM 20 may retransmit the CM registration request message to the CDIS 10.

Upon receiving the CM registration request message, the CDIS 10 may perform CM registration and transmit the CM registration response message, for example, a CM_Registration_Response message, to the CM 20 (S115).

The CM 20 may transmit, to the CE 30, the registration response message, for example, the CE_Registration_Response message, for a reception confirmation response to the CM registration request message requested by the CE 30 (S116).

Meanwhile, the orders of steps S113 to S116 among operations described with reference to FIG. 11(a) may be changed according to a specific embodiment. Especially, in FIG. 11(a), although transmission of the CE registration response message from the CE 20 to the CE 30 is illustrated as being performed after transmission of the CM registration response message from the CDIS 10 to the CM 20, transmission of the CE registration response message from the CM 20 to the CE 30 may be performed at any time after transmission of the CE registration request message from the CE 30 to the CM 20.

FIG. 11(b) is similar to FIG. 11(a) except for some parts. In more detail, FIG. 11(b) illustrates a WSO registration update procedure and includes step S111-1 that is different from a corresponding step of FIG. 11(a). Steps S112-1 to S115-1 of FIG. 11(b) are identical or similar to steps S113 to S116 and, therefore, a repetitive description thereof is omitted.

A WSO 100 may transmit a message indicating new registration information, that is, a NewRegInfo indication primitive, to a CE 30 (S111-1). This process is performed in order for the WSO 100 to update registration information thereof to a coexistence system. Upon receiving the new registration information of the WSO, the CE 30 may perform the WSO registration update procedure. The next steps S112-1 to S125-1 are identical to steps S113 to S116 of FIG. 11(a) and, therefore, a description thereof is omitted.

Meanwhile, when registration of the WSO or the CE and registration of the CM is completed, it is necessary to check whether the WSO or the CE is available. In other words, when the CM in a TVWS network communicates with the CE or the WSO registered therein, it is necessary to check whether a communication session of a higher layer of a transmission control protocol (TCP)/Internet protocol (IP) exchanging messages is in a normal connection state. This is because success of the registration procedure does not guarantee that a session state of the registered entity (e.g. CE) and the registering entity (e.g. CM) is in a normal state and because there is a time difference between the registration and actual communication between the entities.

For example, a power source of the WSO including the CE is abruptly cut off, the CM cannot sense that the CE or the WSO has been disabled and thus cannot immediately update this situation to a neighbor list of the CDIS. Furthermore, the CM proceeds to an unnecessary process such as attempt to transmit a message to the CE or the WSO through an existing disconnected communication session, thereby wasting power of the CM.

Accordingly, periodic monitoring of the connection state is needed. If the communication state has been disconnected for a predetermined time or more, the CM immediately ends a corresponding session and stops providing a coexistence service to the CE, thereby preventing the probability of incorrect operation and preventing waste of a frequency/channel resource and a power resource.

Figure 12:
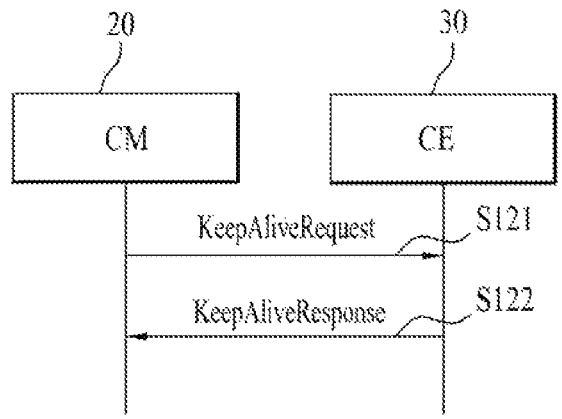
FIG. 12 illustrates an availability or status check procedure according to an embodiment of the present disclosure.
Figure 12:
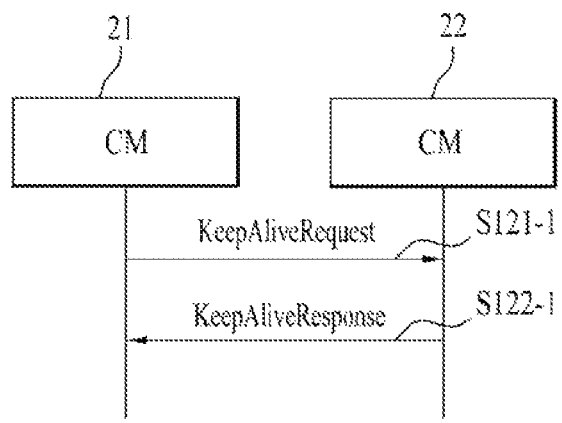
Figure 12:
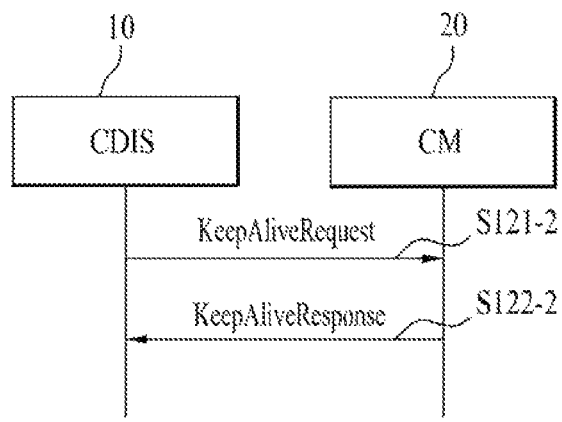

FIG. 12 is a flowchart of a procedure for checking availability or status of a peer entity, that is, a counterpart entity, according to an embodiment of the present invention. FIG. 12(a) illustrates a procedure between a CM and a CE which is registered in the CM, FIG. 12(b) illustrates a procedure between CMs, and FIG. 12(c) illustrates a procedure between a CDIS and a CM. Although each of FIGS. 12(a) to 12(c) illustrates the procedure performed between one requesting entity (an entity in the left of each figure, i.e. an entity transmitting a "request" message) and one responding entity (an entity in the right of each figure, i.e. an entity transmitting a "response" message), the responding entity may be at least one responding entity, that is, plural responding entities.

The requesting entity (a CM or CDIS) may initiate an availability (or status) check procedure for checking availability or status of a peer entity. If the requesting entity is a CM, the responding entity may be a CE or another CM and, if the requesting entity is a CDIS, the responding entity may be a CM.

FIG. 12(a) illustrates a procedure of transmitting and receiving an availability check request (KeepAliveRequest) message and an availability check response (KeepAliveResponse) message between a CM 20 and a CE 30. The availability check request message may be transmitted to the CE 30 at a time interval determined as a time parameter (period) value in the following Table 1 (S121). If it is checked through the availability check request message that at least one CE has no response, the CM 20 may proceed to a deauthentication procedure of the corresponding CE.

Meanwhile, if no response is received from the CE 30, the CM 20 may retransmit the availability check request message a number of times indicated by a number-of-retries parameter (NumberOfRetry) value. If the number-of-retries parameter value received by the CE 30 is a negative number, the CE 30 may transmit the availability check response message to the CM 20 a number of times indicated by an absolute value of the number-of-retries parameter value at a time interval indicated by the time parameter value (S122).

The following Table 1 shows configuration of information elements of the check request message. The time parameter (period) value indicates a transmission period of the check request message in seconds and the number-of-retries parameter (NumberOfRetry) value indicates the number of remaining retries of the check request message. The CM 20 transmits the check request message and, if the check response message is not received from the CE 30 during a time corresponding to the time parameter value, the CM 20 may attempt to retransmit the check request message a number of times indicated by the number-of-retries parameter value.

TABLE 1

| Information element | Data type | Description |
| --- | --- | --- |
| Period | integer | Interval time value in seconds between each successive KeepAliveRequest |

TABLE 1-continued

| Information element | Data type | Description |
| --- | --- | --- |
| NumberOfRetry | integer | Rest number of retry. In case of no response received within timeout, this value decreases by one per each time until zero. |

The following Table 2 shows configuration of information elements of the check response message

TABLE 2

| Information element | Data type | Description |
| --- | --- | --- |
| CID | integer | CoexistenceDeviceID (A unique ID allocated by the CDIS which the TVBD network or device has registered) |
| status | Boolean | Status: successful or not |

A CID value is an integer and indicates an identifier (ID) of a coexistence device, i.e. an ID of the CE 30 in this case. The CID corresponds to a unique ID allocated by a CDIS in which a TVBD device (or TVWS device) is registered. A status value is given as a Boolean value. If it is determined that the responding entity 30 normally receives the check request message from the requesting entity 20, the status value may be set to "successful" and, if not, the status value may be set to "not successful". The CE 30 may transmit the check response message to the CM 20 in response to the check request message (S122).

FIG. 12(b) illustrates a procedure of transmitting and receiving an availability check request (KeepAliveRequest) message and an availability check response (KeepAliveResponse) message between a CM 21 and a CM 22. The availability check request and response messages may be used when a master CM periodically monitors a session state with a slave CM. The check request message may be transmitted to the CM 22 at a time interval determined as a time parameter (period) in the following Table 3 (S121-1). If it is checked through the availability check request message that at least one CE has no response, the CM 21 may proceed to a deauthentication procedure of the corresponding CM.

Meanwhile, if no response is received from the CM 22, the CM 21 may retransmit the check request message a number of times indicated by a number-of-retries parameter (NumberOfRetry) value. If the number-of-retries parameter value received by the CM 22 is a negative number, the CM 22 may transmit the availability check response message to the CM 21 a number of times indicated by an absolute value of the number-of-retries parameter value at an interval indicated by the time parameter value (S122-1).

The following Table 3 shows configuration of information elements of the check request message. A time parameter (period) value indicates a transmission period of the check request message in seconds and a number-of-retries parameter (NumberOfRetry) value indicates the number of remaining retries of the check request message. The CM 21 transmits the check request message and, if the check response message is not received from the CM 22 during a time corresponding to the time parameter value, the CM 21 may reattempt to transmit the check request message a number of times indicated by the number-of-retries parameter value.

TABLE 3

| Information element | Data type | Description |
| --- | --- | --- |
| Period | integer | Interval time value in second between each successive KeepAliveRequest |
| NumberOfRetry | integer | Rest number of retry. In case of no response received within timeout, this value decreases by one per each time until zero. |

The following Table 4 shows configuration of information elements of the check response message.

TABLE 4

| Information element | Data type | Description |
| --- | --- | --- |
| Version_of_neighbor_list | Integer | Version of neighbor list given by a CDIS |
| status | Boolean | Status: successful or not |

A version of a neighbor list (Version_of_neighbor_list) value is an integer and corresponds to a version of a neighbor list given by the CDIS. A status value is given as a Boolean value. If it is determined that the responding entity 22 normally receives the check request message from the requesting entity 21, the status value may be set to "successful" and, if not, the status value may be set to "not successful". The CM 22 may transmit the check response message to the CM 21 in response to the check request message (S122-1).

FIG. 12(c) illustrates a procedure of transmitting and receiving an availability check request (KeepAliveRequest) message and an availability check response (KeepAliveResponse) message between a CDIS 10 and a CM 20. The check request message may be transmitted to the CM 20 at a time interval determined as a time parameter (period) value in the following Table 5 (S121-2). If it is checked through the availability check request message that at least one CM has no response, the CDIS 10 may proceed to a deauthentication procedure of the corresponding CM.

Meanwhile, if no response is received from the CM 20, the CDIS 10 may retransmit the check request message a number of times indicated by a number-of-retries parameter (NumberOfRetry) value. If the number-of-retries parameter value received by the CM 20 is a negative number, the CM 20 may transmit the availability check response message to the CDIS 10 a number of times indicated by an absolute value of the number-of-retries parameter value at an interval indicated by the time parameter value (S122-2).

The following Table 5 shows configuration of information elements of the check request message. The time parameter (period) value indicates a transmission period of the check request message in seconds and the number-of-retries parameter value indicates the number of remaining retries of the check request message. The CDIS 10 transmits the check request message and, if the check response message is not received from the CM 20 during a time corresponding to the time parameter value, the CDIS 10 may reattempt to transmit the check request message a number of times indicated by a number indicated by the number-of-retries parameter value.

TABLE 5

| Information element | Data type | Description |
| --- | --- | --- |
| Period | integer | Interval time value in second between each successive KeepAliveRequest |
| NumberOfRetry | integer | Rest number of retry. In case of no response received within timeout, this value decreases by one per each time until zero. |

Table 6 shows configuration of information elements of the check response message.

TABLE 6

| Information element | Data type | Description |
| --- | --- | --- |
| status | Boolean | Status: successful or not |
| List of CIDs (Optional) | Array of integer | List of CIDs of CMs connecting to the CM |

A status value is given as a Boolean value. If it is determined that the responding entity 20 normally receives the check request message from the requesting entity 10, the status value may be set to "successful" and, otherwise, the status value may be set to "not successful". The CM 20 may transmit the check response message to the CDIS 10 in response to the check request message (S122-2). A list of CIDs is optional and indicates a list of TVWS devices currently connected to the responding entity 20.

Configuration of the information elements of the check request (KeepAliveRequest) message shown in the above Tables 1, 3, and 5 may be proposed as follows.

TABLE 7

| Information element | Data type | Description |
| --- | --- | --- |
| KeepAliveExpriryTimeValue | Real | Indicates KeepAliveExpiryTime parameter value in second |
| requestingEntityStatus | — | Indicates status of the requesting entity |

KeepAliveExpiryTimeValue may indicate an expiry time parameter of the check request message in seconds. In more detail, KeepAliveExpiryTimeValue corresponds to the time parameter of Tables 1, 3, and 5. requestingEntityStatus indicates the status of a requesting entity of the check request message.

The requesting entity may transmit the check request message to the responding entity to check availability or status of the responding entity. The availability corresponds to a value indicating whether a session with a corresponding TVWS entity is available. The requesting entity may determine whether the check response message is received within a time corresponding to the time parameter (KeepAliveExpiryTimeValue) in response to the check request message. The availability or status of the responding entity may be determined according to whether the checking response message is received by the requesting entity within a time corresponding to the time parameter. In other words, the availability of the responding entity may be checked based on the time parameter.

Upon receiving the check response message within a time corresponding to the time parameter value, the requesting entity may determine that the responding entity is available and end the availability check procedure.

In addition, the requesting entity may transmit the check request message to the responding entity a predetermined number of times (e.g. the number-of-retires parameter value). For example, the predetermined number of times may be determined as n times and the requesting entity may transmit the check request message a maximum of n times. After transmitting check request message #1 to the responding entity, if the check response message is not received within a time corresponding to a time parameter value included in the check request message #1, the requesting entity may transmit check request message #2 to the responding entity. In this way, the requesting entity may transmit a maximum of n check request messages to the responding entity. If the check response message is received from the responding party within a time corresponding to the time parameter value included in the check request message within the range of n check request messages, the availability check procedure may be ended.

Meanwhile, if the check response message is not received within the time corresponding to the time parameter value, the requesting entity may determine that the responding entity is not available.

In addition, the responding entity may also determine the availability or status of the requesting entity using the availability check procedure. If no check request message is received from the requesting entity within the time corresponding to the time parameter value, the responding entity may determine that the requesting entity is not available.

Configuration of the information elements of the check response (KeepAliveResponse) message shown in Tables 2, 4, and 6 may be proposed as the following Table 8.

TABLE 8

| Information element | Data type | Description |
| --- | --- | --- |
| respondingEntitystatus | — | Indicates status of the responding entity |

The respondingEntityStatus indicates status of a responding entity of the check request message. The responding entity may transmit the check response message including status thereof to the requesting entity.

Figure 13:
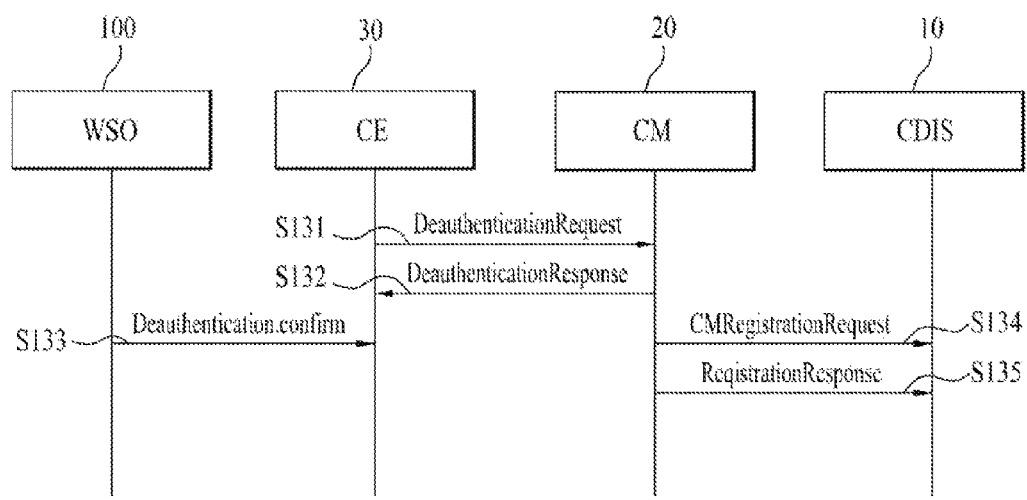
FIG. 13 illustrates a deauthentication procedure according to an embodiment of the present disclosure.
Figure 13:
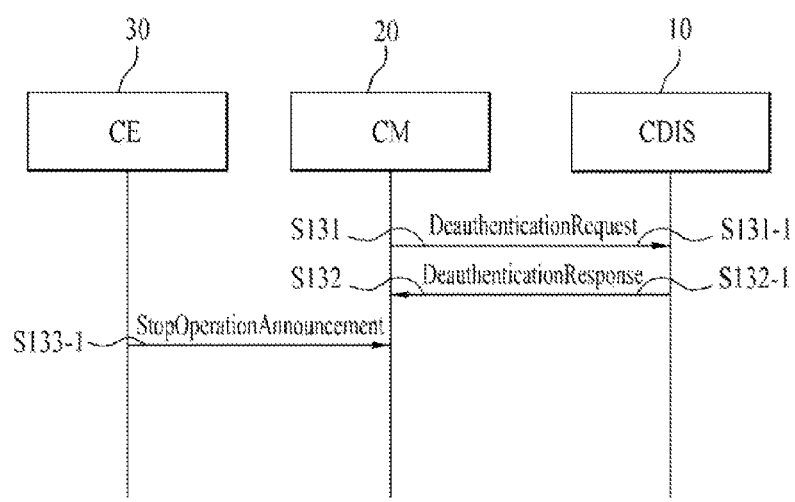

FIG. 13 illustrates a deauthentication procedure according to an embodiment of the present invention. As described above in association with FIG. 12(a), if no response of the CE to the check request message is received, that is, if the check response message is not received during a time corresponding to the time parameter value, the deauthentication procedure of the CE can be performed.

FIG. 13 (a) illustrates a deauthentication procedure of a WSO or CE and FIG. 13(b) illustrates a deauthentication procedure of a CM. First, a description of FIG. 13(a) will be given.

Upon receiving a request for operation stop, a CE 30 may initiate a WSO deauthentication procedure. If the request for operation stop is received, the CE 30 may generate a deauthentication request (DeauthenticationRequest) message and transmit the deauthentication request message to the CM 20 (S131).

Upon receiving the deauthentication request message, the CM 20 may perform WSO deauthentication, generate a deauthentication response (DeauthenticationResponse) message using CM authentication information, and transmit the deauthentication response message to the CE 30 (S132). In more detail, upon receiving the deauthentication request message, the CM 20 may transmit the deauthentication response message to the CE 30 as an confirmation response to the deauthentication request message and then transmit, to a CDIS 10, a CM registration request (CMRegistrationRequest) message for WSO deauthentication from the CDIS 10 (S134). Thereafter, the CM 20 may wait for a registration response message to be received from the CDIS 10 in response to the CM registration request message. If the registration response message is not received from the CDIS 10 within a predetermined time, the CM 20 may retransmit the CM registration request message to the CDIS.

Meanwhile, upon receiving the deauthentication response message, the CE 30 may transmit a deauthentication confirmation primitive to the WSO (S133). The deauthentication confirmation primitive serves to inform the WSO of a deauthentication result and may include a status parameter indicating whether deauthentication has been successfully performed.

Upon receiving registration request message from the CM 20, the CDIS 10 may process the CM registration request message, generate a response message to the CM registration request message, and transmit the response message to the CM 20 (S135). After receiving the response message from the CDIS 10, the CM 20 may process the response message.

Next, a description of FIG. 13(b) will be given. Upon receiving a request for operation stop, the CM 20 may initiate a CM deauthentication procedure. After receiving the request for operation stop, the CM 20 may generate a deauthentication request message using CM authentication information and transmit the deauthentication request message to the CDIS 10 (S131-1). Upon receiving the deauthentication request message, the CDIS 10 may perform CM deauthentication and transmit a deauthentication response message to the CM 20 (S132-1). This is overlapped with a description of S134 and S135 of FIG. 13(a) and, therefore, reference may be made thereto.

After receiving the deauthentication response message, the CM 20 may process the deauthentication response message, generate a stop operation announcement (StopOperationAnnouncement) message, and transmit the stop operation announcement message to all CEs registered therein, for example, the CE 30 in FIG. 13(b) (S133-1).

Upon receiving the stop operation announcement message, the CE 30 may transmit a stop operation confirmation message to the CM 20, enter a stop operation state, skip a deauthentication procedure, and await a request for operation start.

Meanwhile, the embodiments described in association with FIGS. 11 to 13 may be implemented by a combination thereof. For example, the embodiments related to FIGS. 11 and 12 may be implemented by a combination thereof and the embodiments related to FIGS. 12 and 13 may be implemented by a combination thereof.

The method according to the present invention which has been described up to now may be carried out by software, hardware, or a combination of software and hardware. For example, the method according to the present invention may be stored in a storage medium (e.g. an interior memory of a mobile terminal, a flash memory, a hard disk, etc.) or may be implemented by code or instructions in a software program which are executed by a processor (e.g. a microprocessor in the mobile terminal.

As exemplary hardware, a terminal or an apparatus according to the embodiments of the present invention is inclusive of a mobile terminal (e.g. a user equipment (UE), a mobile equipment (ME), a mobile station (MS), a user terminal (UT), a subscriber station (SS), a mobile subscriber station (MSS), a wireless device a handheld device, or an access terminal (AT)), a digital TV, a global positioning system (GPS) navigator, a portable game console, an MP3 player, and an electronic product, which are capable of implementing the above-described embodiments of the present invention.

While the apparatus and method according to at least one embodiment of the present disclosure have been described with reference to the illustrated drawings as described above, the present disclosure is not limited to the embodiments and drawings disclosed therein and those skilled in the art will appreciate that various modifications can be made within a technical idea of the present invention.

The construction and method of the above-described embodiments is not limitedly applied to the above method for selecting a representative device in a coexistence system and all or part of the embodiments can be selectively combined so that various modifications can be made to the embodiments.

Terms or words used in the present disclosure and the following claims should not be limited to a general or lexical definition but should be interpreted as having a meaning and concept corresponding to the technical idea of the present disclosure.

Therefore, the embodiments disclosed in the present disclosure and the constructions illustrated in the drawings are purely exemplary and do not represent the technical idea of the present disclosure, so it should be understood that various equivalents and modifications thereof may exist at the time of filing this application.

INDUSTRIAL APPLICABILITY

The embodiments of the present invention are applicable to a variety of devices or terminals in a wireless communication system.

The invention claimed is:

1. A method for checking availability of a coexistence enabler (CE) connected to one of television white space (TVWS) devices, by a management device for enabling the TVWS devices to coexist in a TVWS, the method comprising:
transmitting a check request message including a time parameter and a number-of-retries parameter for checking availability of the CE to the CE;
receiving a check response message in response to the check request message from the CE: and
checking the availability of the CE based on the time parameter,
wherein, if the management device does not receive the check response message, the management device transmits N check request messages to the CE at a transmission interval corresponding to the time parameter, N is indicated by a value of the number-of-retries parameter.

2. The method according to claim 1, wherein, if the value of the number-of-retries parameter is a negative number, N is indicated by an absolute value of the number-of-retries parameter.

3. The method according to claim 1, further comprising:
if the CE does not response of all of the N check request messages, performing de-authentication of a TVWS device connected to the CE.

4. The method according to claim 1, wherein the checking comprises determining that the CE is available if at least one check response message in response to the N check request messages is received from the CE within a time corresponding to a time parameter included in at least one check request message corresponding to the at least one check response message.

5. The method according to claim 1, wherein the checking comprises determining that the CE is not available if check response messages in response to the N check request messages are received from the CE after a time corresponding to a respective time parameter included in each of the N check request messages.

6. A method for checking availability of a management device for managing television white space (TVWS) devices by a server for enabling the TVWS devices to coexist in a TVWS, the method comprising:
transmitting a check request message including a time parameter and a number-of-retries parameter for checking availability of the management device to the management device;
receiving a check response message in response to the check request message from the management device; and
checking the availability of the management device based on the time parameter,
wherein, if the server does not receive the check response message, the server transmits N check request messages to the management device at a transmission interval corresponding to the time parameter, N is indicated by a value of the number-of-retries parameter.

7. The method according to claim 6, wherein, if the value of the number-of-retries parameter is a negative number, N is indicated by an absolute value of the number-of-retries parameter.

8. The method according to claim 6, further comprising:
if the management device does not response of all of the N check request messages, performing de-authentication of the management device.

9. The method according to claim 6, wherein the checking comprises determining that the management device is available if at least one check response message in response to the N check request messages is received from the management device within a time corresponding to a time parameter included in at least one check request message corresponding to the at least one check response message.

10. The method according to claim 6, wherein the checking comprises determining that the management device is not available if check response messages in response to the N check request messages are received from the management device after a time corresponding to a respective time parameter included in each of the N check request messages.

* * * * *